United States Patent [19]

Canfield et al.

[11] 4,194,077
[45] Mar. 18, 1980

[54] BATCH SENSOR FOR GLASS-MELTING FURNACES

[75] Inventors: Sheldon A. Canfield; Walter J. Karch, both of Newark, Ohio

[73] Assignee: Owens-Corning Fiberglas Corporation, Toledo, Ohio

[21] Appl. No.: 864,429

[22] Filed: Dec. 27, 1977

[51] Int. Cl.² .............................................. C03B 5/02
[52] U.S. Cl. ........................................ 13/6; 65/160; 65/335
[58] Field of Search ................... 13/6, 23, 33; 65/160, 65/335; 73/290 R

[56] References Cited
U.S. PATENT DOCUMENTS 2,625,658  1/1953  Robinson ........................... 65/160 X
3,980,460  9/1976  Nelson et al. ......................... 13/6 X Primary Examiner—Roy N. Envall, Jr.
Attorney, Agent, or Firm—Ronald C. Hudgens; Charles F. Schroeder; Allen D. Gutchess, Jr.

[57] ABSTRACT

A glass-melting furnace is provided with means for sensing the batch in the furnace. More specifically, the sensor determines the level or height of the batch in the furnace without physical contact therewith and with the aid of this value, the thickness of the batch can be determined. With the batch thickness known, the power input for the electrodes of the furnace can be changed or the supply of batch to the furnace can be altered to maintain the batch thickness at a constant value in the furnace or to maintain the glass level constant.

23 Claims, 4 Drawing Figures

BATCH SENSOR FOR GLASS-MELTING FURNACES

This invention relates to a glass-melting furnace with sensing means for determining the level of batch therein without physical contact with the batch.

The invention is primarily concerned with an electrically-operated, glass-melting furnace. With this type of furnace, electrodes project into the furnace tank in a predetermined pattern and are immersed in molten glass therein. Glass batch is continually supplied on top of the molten glass so as to provide both a source of supply and an insulating layer or crust thereover. Additional glass batch is supplied by a feeder which is supported in a predetermined plane above the glass batch. The feeder is movably supported on rails located on one or both sides of the tank with the feeder moved back and forth transversely across the furnace and longitudinally between the ends thereof to traverse the entire batch layer and to supply batch on the layer in a predetermined pattern. The batch supplied to the layer must be carefully controlled to assure that a minimum thickness will be maintained over all of the top of the tank in order to reduce heat loss and also to protect the feeder itself against excessive heat.

The electrically-heated, glass-melting furnace also has an outlet or forehearth through which the molten glass flows. It is also important that the level of the molten glass in the forehearth, which does not have any batch thereon, be maintained constant for many operations. For example, where the glass from the forehearth is supplied to fiber-forming bushings, a change in the level of the glass in the forehearth can affect the operation of the bushings and a fluctuation in level can seriously hamper proper bushing through-put.

In accordance with the invention, a batch level or height sensor or sensing means is provided for the batch feeder and moves back and forth in a given horizontal plane over the batch along with the feeder. The sensor determines the batch level without any physical contact therewith and with this value, the batch thickness can be determined. In a preferred form, the sensor employs ultrasonic waves to determine the batch level. According to this level, the power input to the furnace or the batch supplied on top of the batch layer or crust can be changed in order to maintain the batch thickness constant, the through-put of the furnace constant, and the glass level in the forehearth constant.

It is, therefore, a principal object of the invention to provide an improved sensor for an electrically-operated, glass-melting furnace to determine the height of batch therein without physical contact therewith.

Another object of the invention is to provide an improved sensing method and apparatus for maintaining the layer of batch in an electrically-operated, glass-melting furnace at a constant thickness.

Many other objects and advantages of the invention will be apparent from the following detailed description of a preferred embodiment thereof, reference being made to the accompanying drawings, in which.

Figure 1:
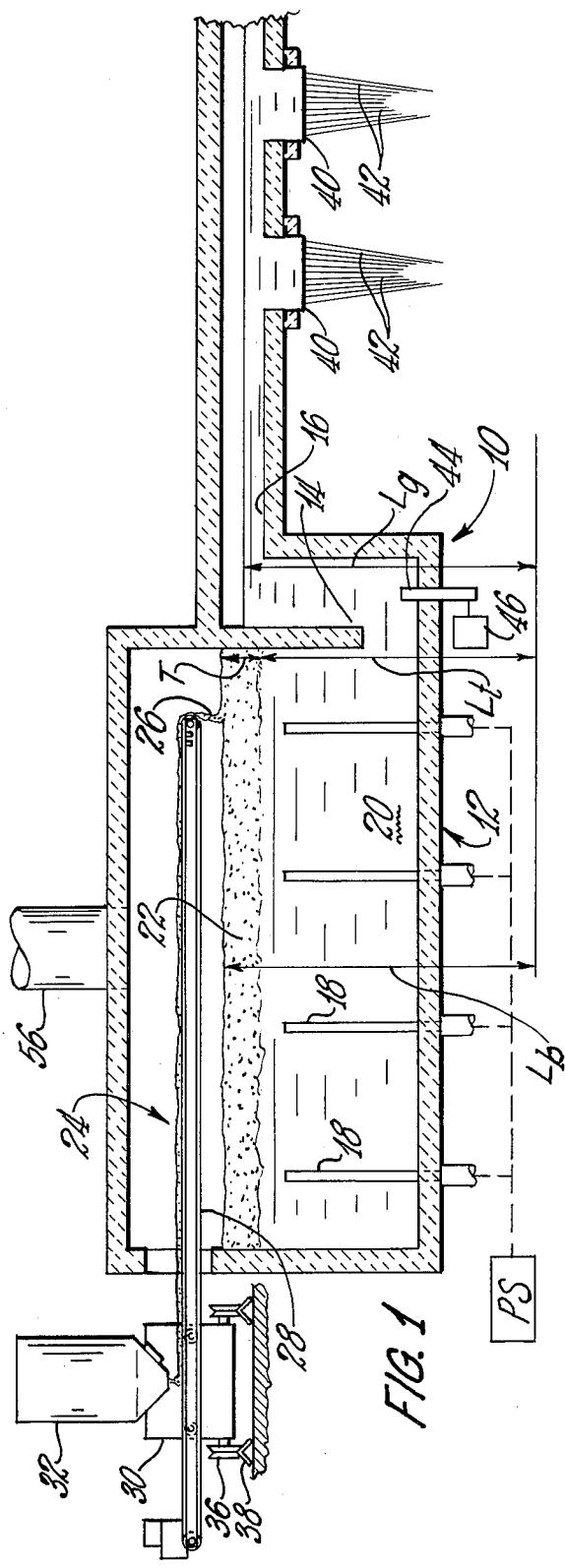
FIG. 1 is a somewhat schematic view in longitudinal cross section of an electrically-operated, glass-melting furnace embodying the invention.

Referring to the drawings, and particularly to FIG. 1, an overall glass-melting furnace embodying the invention is indicated at 10 and includes a melting tank 12 from which glass is discharged past a skimmer block 14 to a discharge passage or forehearth 16. A plurality of electrodes 18 extend upwardly into the tank from a lower level. The electrodes 18 are suitably positioned throughout the tank in a desired pattern as is well known in the electrical furnace art. The glass in the tank 12 is melted by current flowing between the electrodes 18 to form a pool 20 of molten glass, with power being supplied to the electrodes from a source of power and controls designated P.S. A layer or crust 22 of glass batch is established on the surface of the pool 20 with the batch layer 22 replenishing the molten glass of the pool as it flows upwardly through the forehearth 16. The batch layer 22 also acts as an insulating blanket on the pool to provide higher efficiency for the furnace 10 and also to protect feeding means for the batch.

A batch feeder 24 supplies batch 26 over the top of the layer 22 in a predetermined pattern. The batch feeder 24, in this instance, includes a belt conveyor 28 supported and driven by a drive unit 30. Batch is supplied to the belt conveyor 28 from a supply hopper 32 with the rate of feed from the hopper 32 to the belt 28 being controlled by a vibrator 34 mounted on the hopper, the amplitude of the vibrator controlling the rate of flow of the batch.

The belt 28 is moved back and forth in left-hand and right-hand directions, as viewed in FIG. 1, by the drive unit 30 to supply the batch 26 substantially uniformly longitudinally of the tank 12. The drive unit 30 also has wheels 36 mounted on rails 38 to move the unit 30 and the belt 28 back and forth transversely of the tank 12 to supply the batch transversely over the layer 22. Rather than the feeder 24 supported at only one side of the tank, a batch feeder in the form of a cart can be located above the batch layer 22 on supporting beams which extend across the tank and are movably supported on tracks on opposite sides of the tank.

In this furnace, the molten glass of the pool 20 flows under the skimmer block 14 and along the forehearth 16 to fiber-forming bushings 40, from which glass fibers 42 are attenuated, as is known in the art. A change in the level of the molten glass in the forehearth 16 can change the through-put of the bushings and alter the bushing operations to a substantial degree. Therefore, it is desirable to maintain constant the glass level in the forehearth. This level, in turn, can be controlled by regulating the thickness of the glass batch layer or crust and the height or level of it in the tank 12. The level of the molten glass in the forehearth 16 is commonly measured by means of a bubbler indicated at 44 which emits air or other gas into the glass beyond the skimmer block 14, with the back pressure of the gas in the bubbler 44 measured by a suitable pressure-sensing device 46, as disclosed in Tretheway U.S. Pat. No. 3,200,971. The level of the glass batch in the tank 12 can also be measured by similar or other suitable sensing means.

The relationship between the level of the batch layer 22 and the level of the glass in the forehearth 16 and the tank 12, as measured from a common datum line, is shown by the following equation:

$$T = L_b - L_t = (L_b - L_g)/(1 - d_b/d_g)$$

Wherein:

$L_b$ = level of the batch layer
$L_t$ = level of the molten glass in the tank 12
T = thickness of the batch layer 22
$L_g$ = level of the molten glass in the forehearth 16
$d_g$ = density of the glass
$d_b$ = density of the batch The density of the batch will vary slightly according to the thickness of the layer 22 due to the compaction of the batch. However, this variation is not of sufficient magnitude to be significant in the vast majority of cases.

From the above relationship, it will be seen that the thickness T of the batch layer or crust can be determined by measuring the glass level $L_g$ through the bubbler 44 and by measuring the level or height $L_b$ of the batch.

The batch level can be determined by non-contact means in the form of an ultrasonic sensing unit indicated at 48. The unit 48 is mounted at the discharge end of the belt 28 of the feeder 24 and moves therewith over the batch. The unit 48 includes a sending transducer 50 and a receiving transducer 52, which are commercially available. The sender 50 has barium titanate crystals and an autotransformer to send ultrasonic waves downwardly toward the surface of the batch layer 22. Waves reflected from the surface are received by the receiver 52, with the time delay between sending and receiving indicating the distance of the batch surface from the unit 48. From this, the level $L_b$ of the batch layer can be determined. The signal from the unit 48 is received by circuitry located in a housing 54 near the outer end of the belt 28.

Figure 3:
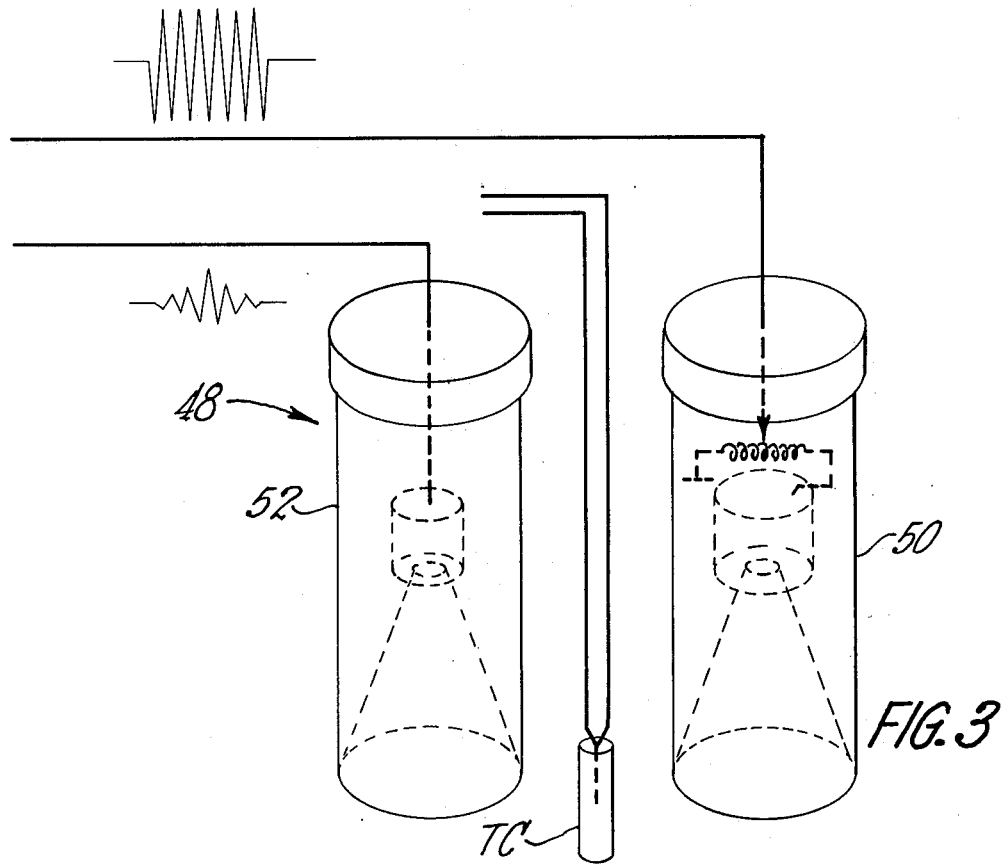
FIG. 3 is a schematic view of level-sensing means in accordance with the invention.

The temperature in the furnace 10 above the batch layer 22 will vary considerably, depending upon the direction and rate of flow of gases through a furnace stack 56 of FIG. 1. Ventilators in the building housing the furnace 10, for example, are usually opened in the summer and shut in the winter. In the latter instance, a downdraft can occur in the stack 56 to cause the temperatures above the batch layer 22 to be very low. In practice, it has been found that the temperature above the layer 22 actually will vary from as low as $-5°$ F. to as high as 220° F. Since temperature change affects the sensing unit 48, and the rate of wave transmission, a temperature sensor or thermistor TC (FIG. 3) is employed adjacent the sender and receiver 50 and 52. The signal from the temperature sensor is fed to a compensating circuit located in a housing 58 adjacent the housing 54.

Figure 4:
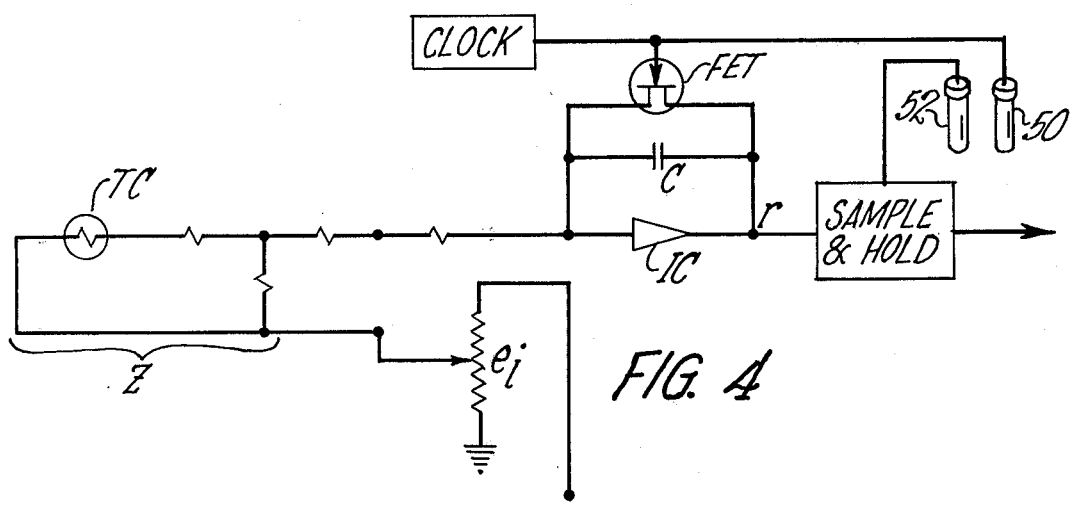
FIG. 4 is a diagrammatic view of a circuit employed with the sensing means of FIG. 3.

The circuitry of the housings 54 and 58 is shown in FIG. 4. Each time a clock designated such is pulsed, a pulse of energy is transmitted by the sender 50 toward the batch layer 22. At this time, an integrated circuit in the form of an operational amplifier IC is reset to zero through a field effect transistor FET and begins to integrate upwardly. A return pulse from the receiver 52 actuates a Sample and Hold circuit and senses the level to which the circuit IC has risen. The Sample and Hold circuit then retains this value until actuated again. A signal from the Sample and Hold circuit equals:

$$\frac{1}{ZC} \int_0^r e_i \, dt$$

Wherein:
Z = temperature compensation factor
C = capacitance
$e_i$ = bias adjustment
t = time differential
r = output of IC at time t With the proper temperature compensation, this signal is proportional to the distance travelled by the ultrasonic pulse and indicates the level of the batch layer 22.

Figure 2:
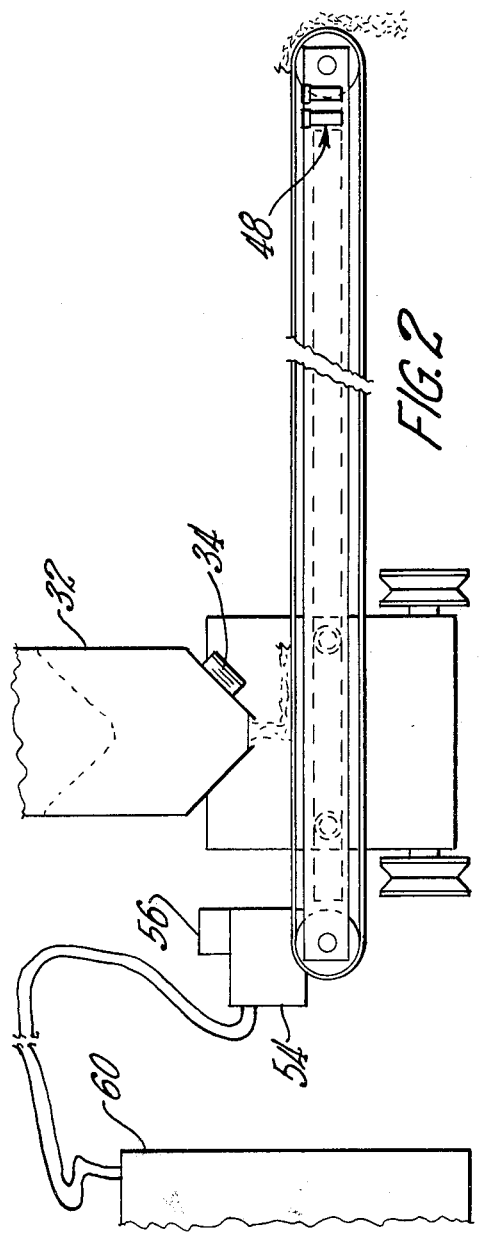
FIG. 2 is an enlarged, side view in elevation of a glass batch feeder of the furnace of FIG. 1.

The signal can be averaged over all or part of the batch layer and fed to a computer 60 of FIG. 2 which also receives other information including the pressure sensed by the sensing device 46. A signal resulting from the computer is then employed to change the power input to the furnace or to change the rate of batch feed thereto, to change the batch level and thickness. In a preferred form, the power input P.S. to the furnace is varied. If the batch is too thick, the power is increased, and vice versa. If desired, the amplitude of vibration of the vibrator 34 can be changed to change the rate of supply of the batch to the belt 24.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. Apparatus for controlling the thickness of glass batch in a glass-melting furnace, said apparatus comprising sensing means positioned above the glass batch for measuring the level of the batch without contacting same, said sensing means producing a signal which is responsive to the level of the glass batch, and means responsive to the signal for causing an increase in the thickness of the glass batch when the level decreases and for causing a decrease in the thickness of the glass batch when the level increases.

2. Apparatus according to claim 1 characterized by moving means for traversing a predetermined path above the glass batch, said sensing means being carried by said moving means.

3. Apparatus according to claim 1 characterized by said sensing means comprising sending means for sending ultrasonic waves toward the glass batch and receiving means for receiving waves reflected from the glass batch.

4. Apparatus according to claim 1 characterized by temperature-sensing means associated with said sensing means for sensing the temperature in the area of said sensing means and for changing the magnitude of the signal therefrom in response to the temperature sensed.

5. Apparatus for controlling the thickness of glass batch in a glass-melting furnace, said apparatus comprising sensing means positioned above the glass batch for measuring the level of the batch without contacting same, said sensing means producing a signal which is responsive to the level of the glass batch, and means responsive to the signal for causing an increase in heat input to the furnace when the level of the batch increases and causing a decrease in the heat input to the furnace when the level of the glass batch therein decreases, thereby to cause a decrease in the thickness of the glass batch when the level of the batch increases and to cause an increase in the thickness of the glass batch when the level of the batch decreases.

6. Apparatus for controlling the thickness of glass batch in a glass-melting furnace having a forehearth, said apparatus comprising sensing means positioned above the glass batch for measuring the level of the glass batch without contacting same, said sensing means producing a signal which is responsive to the level of the glass batch, means for sensing the level of molten glass in the forehearth, computer means for receiving a signal from said glass level sensing means and for receiving the signal from said batch level sensing means and for producing an output signal in response thereto, and means responsive to the output signal for causing an increase in the thickness of the glass batch when the level of the batch decreases, and for causing a decrease in the thickness in the glass batch when the level of the glass batch increases.

7. Apparatus according to claim 6 characterized by said molten glass level sensing means comprises a bubbler.

8. Apparatus for sensing the glass level in a glass-melting furnace having a forehearth, said apparatus comprising means for sensing the level of molten glass in the forehearth, sensing means for measuring the level of the glass batch without contacting same, means for supporting said sensing means above the batch at a predetermined level in the furnace, said sensing means comprising sending means for sending a signal toward the glass batch and receiving means for receiving a signal reflected from the glass batch, and computer means for receiving a signal from said batch sensing means and for receiving a signal from said glass sensing means and for producing an output signal in response thereto.

9. Apparatus according to claim 8 characterized by changing means responsive to the output signal from said computer means for changing the thickness of the layer of the glass batch.

10. Apparatus according to claim 9 characterized by said changing means changes the thickness of the layer of the glass batch by changing the power input to electrodes in the furnace.

11. Apparatus according to claim 9 characterized by said changing means changes the thickness of the layer of the glass batch by changing the heat input to the furnace.

12. Apparatus for sensing the glass batch level in a glass-melting furnace having a forehearth which receives molten glass, said apparatus comprising means for sensing the level of molten glass in the forehearth, moving means for traversing a predetermined path above the glass batch, sensing means carried by said moving means for measuring the level of the glass batch without contacting same, said sensing means comprising sending means for sending a signal toward the glass batch and receiving means for receiving a signal back from the glass batch, and means for receiving a signal from said glass level sensing means and for receiving the signal from said batch level sensing means and for producing an output signal in response thereto.

13. Apparatus for sensing the glass batch level in a glass-melting furnace, said apparatus comprising sensing means for measuring the level of the glass batch without contacting same, means for supporting said means above the batch at a predetermined level in the furnace, said sensing means comprising sending means for sending a signal toward the glass batch and receiving means for receiving a signal reflected from the glass batch, and temperature-sensing means associated with said sensing means for sensing the temperature in the area of said sensing means and for changing the magnitude of the signal therefrom in response to the temperature sensed.

14. Apparatus for sensing the glass batch level in a glass-melting furnace, said apparatus comprising moving means for traversing a predetermined path above the glass batch, sensing means carried by said moving means for measuring the level of the glass batch without contacting same, said sensing means comprising sending means for sending a signal toward the glass batch and receiving means for receiving a signal back from the glass batch, circuit means for receiving a signal from said receiving means, and means for changing one of the heat input means and the batch supply means of the furnace in response to the last-named signal.

15. Apparatus for sensing the glass batch level in a glass-melting furnace, said apparatus comprising moving means for traversing a predetermined path above the glass batch, sensing means carried by said moving means for measuring the level of the glass batch without contacting same, said sensing means comprising sending means for sending a signal toward the glass batch and receiving means for receiving a signal back from the glass batch, temperature-compensating means associated with said sensing means for sensing the temperature in the area of said sensing means and for changing the signal from said sensing means in response thereto.

16. Apparatus for controlling the thickness of glass batch in a glass-melting furnace, said apparatus comprising sensing means positioned above the glass batch for measuring the level of the glass batch, said sensing means producing a signal which is responsive to the level of the glass batch, means for sensing the level of molten glass in the furnace, comparison means for receiving a signal from said glass level sensing means and for producing an output signal indicative of batch thickness, said comparison means including means responsive to said output signal for maintaining the batch layer at a predetermined thickness.

17. Apparatus according to claim 16, wherein the thickness of the glass batch layer equals:

$$(L_b - L_g)/(1 - d_b/d_g)$$

Wherein:
$L_b$ = level of the batch layer
$L_g$ = level of the molten glass in the furnace
$d_g$ = density of the molten glass
$d_b$ = density of the batch.

18. Apparatus according to claim 16 characterized by said maintaining means causing an increase in the thickness of the glass batch when the batch level decreases and for causing a decrease in the thickness of the glass batch when the batch level increases.

19. Apparatus according to claim 16 wherein said glass level sensing means comprises a bubbler.

20. Apparatus for measuring the thickness of glass batch in a glass-melting furnace, said apparatus comprising sensing means for measuring the level of the glass batch, said sensing means producing a signal which is responsive to the level of the glass batch, means for sensing the level of molten glass in the furnace, comparison means for receiving a signal from said glass level sensing means and for receiving the signal from said batch level sensing means and for producting an output signal indicative of batch thickness.

21. Apparatus for sensing the glass batch level in a glass-melting furnace, said apparatus comprising sensing means for measuring the level of the glass batch without contacting same, means for supporting said sensing means above the glass batch at a predetermined level in the furnace, said sensing means comprising sending means for sending ultrasonic waves toward the glass batch, and receiving means for receiving ultrasonic waves reflected from the glass batch.

22. Apparatus according to claim 21 characterized by temperature-sensing means associated with said sensing means for sensing the temperature in the area of said sensing means and for changing the magnitude of the signal therefrom in response to the temperature sensed.

23. In an electrically-operated, glass-melting furnace having a tank, electrodes projecting into the tank for melting glass batch therein to form a pool of molten glass, means forming a source of batch, a batch feeder communicating with said source, means for moving said feeder in a predetermined path over the molten glass to form a layer of glass batch thereon in the furnace, the improvement comprising sensing means carried by said feeder for measuring the level of the glass batch in the furnace without contacting the glass batch by sending ultrasonic waves toward the glass batch, receiving means for receiving reflected ultrasonic waves from the glass batch, circuit means for receiving a signal from said receiving means, which signal is responsive to the level of the glass batch in the furnace, and means responsive to an electrical signal from said circuit means for increasing the batch thickness when the batch level decreases and for decreasing batch thickness when the batch level increases.

* * * * *